Oct. 16, 1923.
A. REEKERS
TROLLING SPOON
Filed Dec. 6, 1920
1,471,280
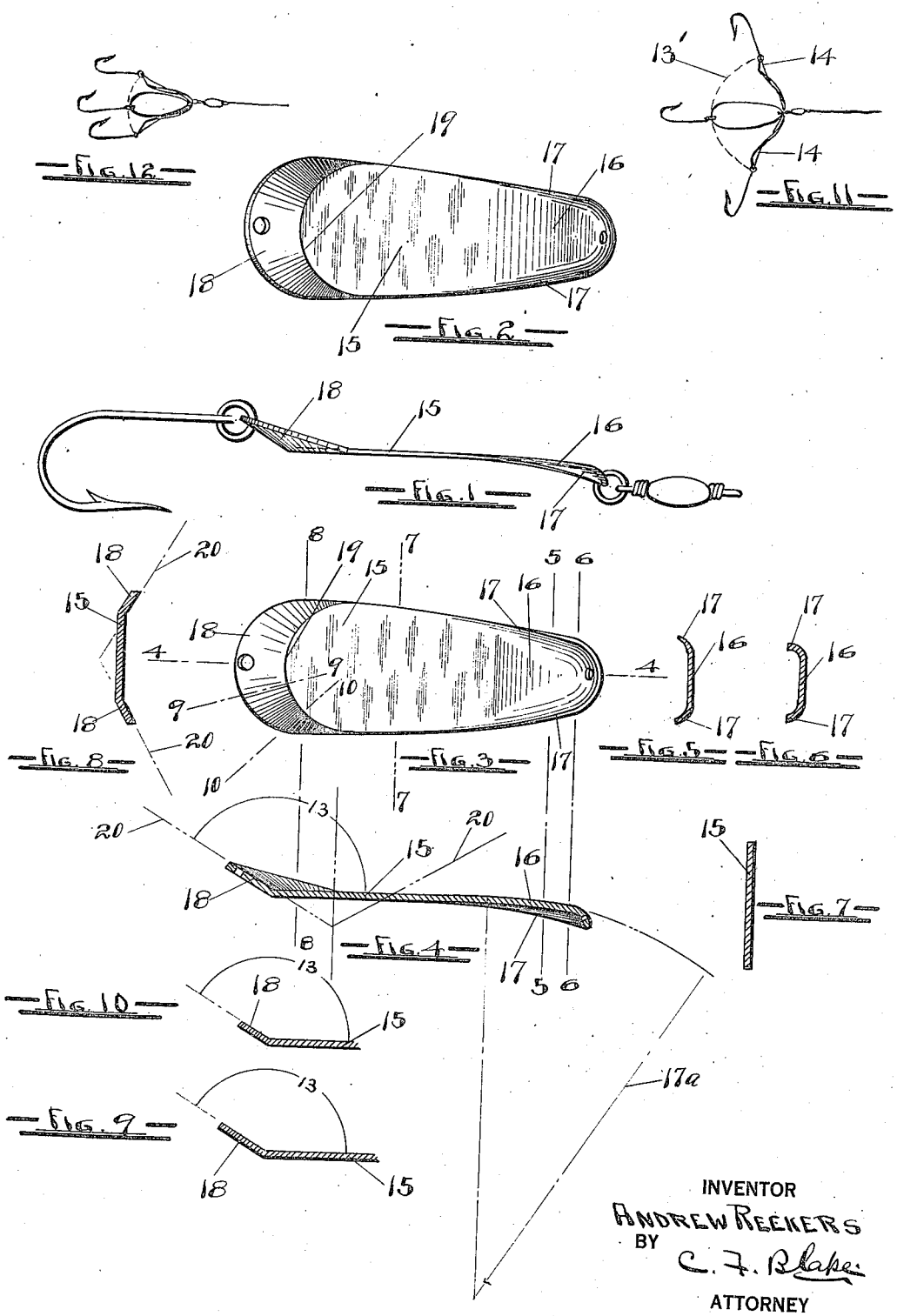
INVENTOR
ANDREW REEKERS
BY
C. F. Blake
ATTORNEY Patented Oct. 16, 1923.

1,471,280

UNITED STATES PATENT OFFICE.

ANDREW REEKERS, OF PORTLAND, OREGON.

TROLLING SPOON.

Application filed December 6, 1920. Serial No. 428,686.

*To all whom it may concern:*

Be it known that I, ANDREW REEKERS, a citizen of the United States, residing at Portland, county of Multnomah, State of Oregon, have invented certain new and useful Improvements in Trolling Spoons, of which the following is a specification.

My invention relates to trolling spoons in general, and particularly to that class thereof that oscillate in action, the object of my invention being to provide such a spoon that will oscillate sharply through a very small radius of action and with little transverse movement, and that will operate successfully at very slow speed.

When using such spoons heretofore it has been found necessary to maintain a considerable speed, often as much as seven miles per hour, in order to insure proper action of the spoon, and such speed is very detrimental for the reason that it requires heavy weights to sink the spoon to a point where it will attract the fish and also that such speed carries the spoon too soon through a school of fish. The novel and peculiar construction of my spoon obviates these difficulties, and the invention lies in the configuration of the spoon.

I accomplish the above objects by means of the construction illustrated in the accompanying drawing, which is a part of this application for Letters Patent, like characters of reference indicating like parts throughout the several views thereof, and in which:

Fig. 1 is a side elevation of my spoon with hook and swivel attached thereto.

Fig. 2 is a plan view of the spoon.

Fig. 3 a reverse plan view of the spoon.

Fig. 4 a sectional elevation upon line 4—4 of Fig. 3.

Figs. 5, 6, 7, 8, 9 and 10 are sections upon lines 5—5, 6—6, 7—7, 8—8, 9—9, and 10—10 respectively of Figs. 3 and 4.

Fig. 11 illustrates the action of spoons heretofore used and Fig. 12 illustrates the action of my spoon.

The spoons heretofore used oscillate through a large arc of curvature or action 13' and have a large transverse movement between the limiting positions of travel 14, as shown in Fig. 11. This results in many fish striking at the spoon and avoiding the hook because of its extreme position at one end of its path of travel at the time, and also results in excessive speed having to be maintained to move the spoon through such wide space and still give to the spoon sufficiently rapid transverse movement to attract the fish. The action of my spoon is illustrated in Fig. 12, wherein it is seen that the spoon travels a much shorter path than that illustrated in Fig. 11, thus maintaining the hook at all times in better position to receive the fish, and also requiring much less speed to cause the spoon to act with sufficient rapidity to attract the fish. My spoon will act at a speed of two miles per hour, and therefore requires much less weight to sink it than spoons heretofore used, and also has the decided advantage of remaining in the school of fish longer.

The body of my spoon is a flat plate 15 terminating at its forward end in a curved portion 16. This portion 16 is straight transversely of the spoon as shown in the sections of Figs. 5 and 6, but is curved longitudinally to a large radius 17, as shown in Fig. 4. The forward end of this portion 16 is substantially semicircular in from, and the edges thereof are dished towards the center of curvature of the portion 16 in a peculiar and novel manner, to wit, the edge of the semicircular end is dished to a small radius, and this dish is carried along the edge of the portion 16 gradually approaching the same until it coincides therewith at substantially the point whereat said portion 16 joins the flat portion 15. Thus the entire forward end of the spoon is dished, and the dished portion is carried backward along the edges of the spoon body on the form of two tapering arms 17 which gradually die out as they approach the portion 15 of the body of the spoon.

The rearward end of the spoon body 15 is dished upon that side thereof opposite to the dished portion of the forward end, but instead of this dished portion joining the body portion in a curve as is the case upon the forward end just described, said dished portion upon the rearward end joins the body portion in a line of well defined contour. The preserving of this line of juncture between the dished portion 18 and the body portion 15 in a very distinct and sharply defined form with no fillet between said joining portions 15 and 18 is a very important mechanical feature of my invention, playing an important rôle in limiting the action of the spoon to a short path of travel.

While the dished portion 18 may have any desired form provided the line of juncture between it and the body portion is preserved in distinct outline, it has been found desirable that said line of juncture be substantially a semicircle as shown at 19 in Figs. 2 and 3, and that in all radial sections such as shown in Figs. 9 and 10 the angle 13 between the dished portion 18 and the body portion 15 shall be constant. This latter condition determines that the dished portion 18 shall preferably be a portion of a cone, as illustrated by the broken lines 20 in Figs. 4 and 8, the body portion 15 intersecting said cone in a plane normal to the axis thereof, as shown in Fig. 4.

The edge of said dished portion 18 is caused to approach the edges of the body portion 15 upon each side thereof until the edge of the dished portion 18 and the edge of the body portion 15 coincide at points diametrically opposite upon the line of juncture between said dished portion 18 and said body portion 15, as shown in Figs. 1, 2, 3, and 4.

While the preferred form of the dished portion 18 is that of a fragment of a cone, it is not necessary that such should be the case provided that said dished portion is a surface of revolution generated by the movement of a right line inclined to the surface of the body portion 15.

My spoon may be made of any size and constructed of any materials deemed convenient and suitable for a device of this character, and while I have illustrated and described a form of construction found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. In a trolling spoon, a flat body portion and a portion composed of a fragment of a cone, said body portion intersecting said conical portion.

2. In a trolling spoon, a flat body portion and a portion composed of a fragment of a cone, said body portion intersecting said conical portion upon a plane normal to the axis of said cone.

3. In a trolling spoon, a flat body portion and a portion composed of a fragment of a cone, said body portion intersecting said conical portion upon a plane normal to the axis of said cone, and the line of juncture of said portions being distinct and without fillits.

4. In a trolling spoon, a flat body portion and a dished end portion, said end portion being the surface of revolution generated by the movement of a right line inclined to said body portion.

5. In a trolling spoon, a body portion; a rearwardly disposed dished portion, the latter being the surface of revolution generated by the motion of a right line inclined to said body portion; a forwardly disposed dished portion; and dished arms extending rearwardly from said latter dished portion along the edges of said body portion.

6. In a trolling spoon, a fragment of a cone; a flat body intersecting said cone; a dished portion; and dished arms extending from said dished portion to said body portion.

7. In a trolling spoon, a body composed of a flat portion and a curved portion; a forwardly disposed dished end; dished arms extending from said end along each edge of said body; and a rearwardly disposed dished end being a fragment of a cone intersected by said body.

In witness whereof I claim the foregoing as my own I hereunto affix my signature in the presence of two subscribing witnesses at Portland, county of Multnomah, State of Oregon, this 1st day of Nov., 1920.

ANDREW REEKERS.

Witnesses:
C. F. BLAKE,
L. J. ROBINSON.